(12) United States Patent
Zafarana et al.

(10) Patent No.: US 7,486,054 B2
(45) Date of Patent: Feb. 3, 2009

(54) METHOD FOR GENERATING A READING SIGNAL OF A SENSE ELEMENT COMPRISED INTO AT LEAST A PHASE OF A MULTIPHASE CONTROLLER

(75) Inventors: Alessandro Zafarana, Milan (IT); Cristian Porta, Canegrate (IT); Ernesto Manuel Cantone, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 825 days.

(21) Appl. No.: 10/957,530

(22) Filed: Sep. 30, 2004

(65) Prior Publication Data

US 2005/0113981 A1  May 26, 2005

(30) Foreign Application Priority Data

Sep. 30, 2003  (IT) .......................... MI2003A1879

(51) Int. Cl.
*G05F 1/00* (2006.01)
(52) U.S. Cl. ..................................................... 323/217
(58) Field of Classification Search ................ 323/272, 323/283, 241, 217, 300
See application file for complete search history.

(56) References Cited

U.S. PATENT DOCUMENTS

| | | | |
|---|---|---|---|
| 6,343,026 B1* | 1/2002 | Perry | 363/65 |
| 6,424,129 B1* | 7/2002 | Lethellier | 323/272 |
| 6,590,369 B2* | 7/2003 | Burstein et al. | 323/272 |
| 6,788,035 B2* | 9/2004 | Bassett et al. | 323/272 |
| 2001/0038277 A1* | 11/2001 | Burstein et al. | 323/272 |
| 2004/0227495 A1* | 11/2004 | Egan et al. | 323/272 |

* cited by examiner

*Primary Examiner*—Shawn Riley
(74) *Attorney, Agent, or Firm*—Lisa K. Jorgenson; Bryan A. Santarelli; Graybeal Jackson LLP

(57) ABSTRACT

A method for generating a reading signal of a sense element in at least a phase of a multiphase controller controlled by means of PWM control signals having a preset period and a duty cycle varying according to the load current and voltage of said controller, the reading signal being a digital signal having a first logic value during a reading period and a second logic value at the end of the reading period and showing a periodical trend which has a half cycle. The method provides that the value of said half cycle is so set that the reading period ends in a different instant from the switching instants of external power transistors comprised in the driving circuits of the controller phases not being read.

32 Claims, 6 Drawing Sheets

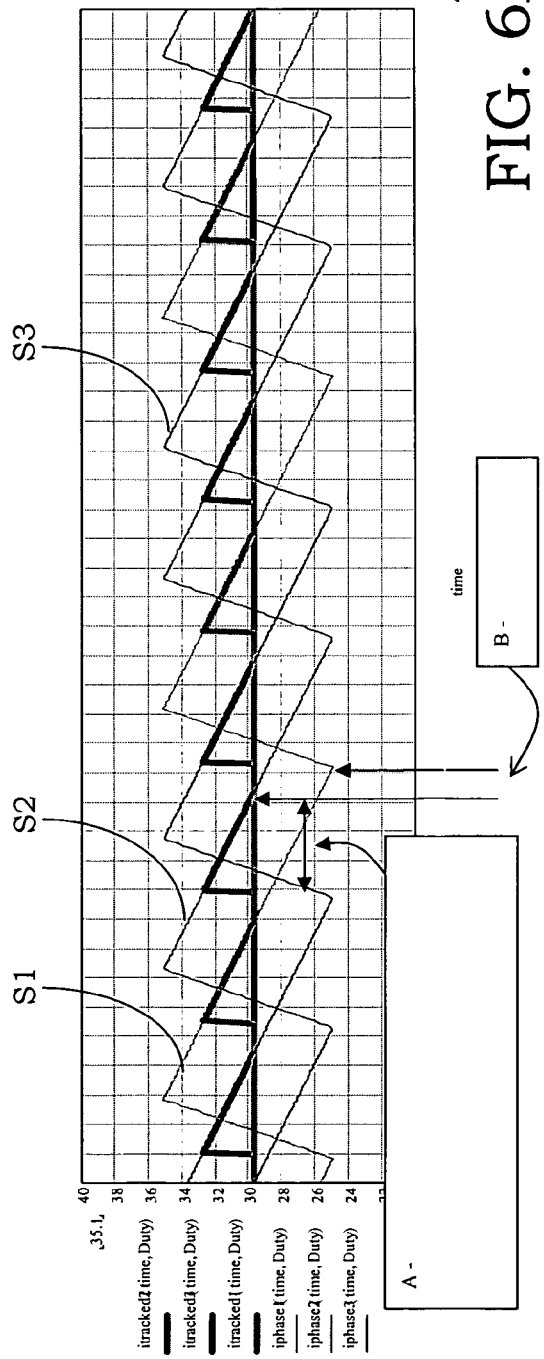
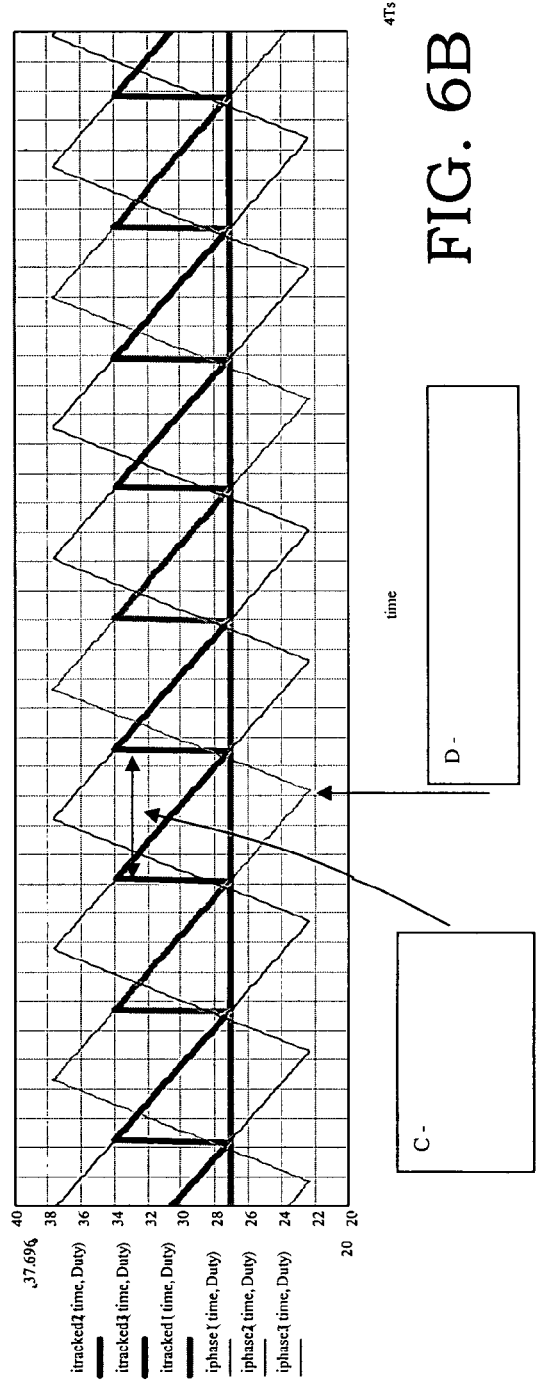
FIG. 6A
FIG. 6B

METHOD FOR GENERATING A READING SIGNAL OF A SENSE ELEMENT COMPRISED INTO AT LEAST A PHASE OF A MULTIPHASE CONTROLLER

PRIORITY CLAIM

The present application claims priority from Italian patent application no. MI2003A001879, filed Sep. 30, 2003, which is incorporated herein by reference.

TECHNICAL FIELD

The present invention relates generally to a method for generating a reading signal of a sense element that composes at least a phase of a multiphase controller.

More particularly, the invention relates to a method for generating a reading signal of a sense element that comprises at least a phase of a multiphase controller controlled by PWM control signals having a preset period and a duty cycle varying according to the load current and voltage of said controller, said reading signal being a digital signal having a first logic value during a reading period and a second logic value at the end of said reading period and showing a periodical trend which has a half cycle.

The invention relates particularly, but not exclusively, to applications to multiphase power controllers of the interleaved DC-DC type and the following description is made with reference to this field of application for convenience of illustration only.

BACKGROUND

As it is known, the term "power-supply controller" means a device converting and regulating the available power provided by a source into the power required by a load having features which are incompatible with the source features. Such a device is also called power converter.

The well known power-supply DC-DC regulators of the interleaved type usually comprise a controller and N modules or phases, in turn comprising a High Side switch and a Low Side switch realized by means of power transistors. It is assumed that a current I is required at the output, the current I being equally split between the N modules.

In particular, as shown in FIG. 1, each module or phase 10 comprises a transistor MH acting as a High Side switch connected in series to a transistor ML acting as a Low Side switch between a first and a second voltage reference, in particular an input voltage Vin and a ground GND.

The module 10 also comprises an inductor L and an output capacitor Cout coupled between an intermediate node X between the transistors MH and ML and the ground GND.

An output voltage value Vout of the module 10 is across the capacitor Cout.

At present, the market of the controllers being used for CPUs (Computing Processing Unit) is orienting towards consumer applicative solutions whereon the cost and the price erosion have generated a high push towards the cheapest possible solutions to the limits of the processor requirements. On the other hand, the speed at which this market develops imposes a compromise between highly integrated solutions (thus cheaper) and flexible solutions that are capable of meeting very short production requirements.

In particular, some solutions prevailed wherein the controller only provides for the control processing and to the power management, while the real power portion (comprising driving circuits—driver—of the Low Side and High Side transistors and more recently also PowerMOS Low Side transistors) has been confined outside the controller.

This choice mainly derives from the difficulty in simultaneously dealing in a precise way with so-called signal and power components.

Controllers for which the hard task of the power and signal integration has been attempted have used as reading method the reading of a signal across the parasitic resistance of the inductor L. In this case, however, reading occurs on a much smaller signal (about ten times smaller) and reading circuits must thus be designed, in a more precise way, and thus they are more expensive in terms of area. These circuits have however unsolved problems linked to the noise generated by the drivers themselves.

Multiphase controllers capable of reading both on the Low Side transistor and on the inductor L are also known, such as for example the L6711 controller marketed by STMicroelectronics, S.r.I. (the Assignee). In particular, this controller has drivers integrated on the same semiconductor substrate as the reading circuits of the controller modules.

This controller has an interleaving DC-DC configuration, used as a cheap and effective solution.

The so-called interleaving configuration typically requires a convenient clock circuit closing the high-side switches of the modules composing the controller with a phase shift being equal to the switching period divided by the number N of modules.

It should be pointed out that, by applying a known voltage mode control to a controller with an interleaving topology an uncontrolled distribution of the currents flowing in the inductances of the parallel modules may be obtained. It is thus often necessary, for a correct controller operation, that the total load current is equally distributed between the different modules, i.e., that each module carries a current corresponding to the current required at the output divided by N. In this case it is the "current sharing" control technique.

This controller uses, as a sense element of the single phases composing it, the parasitic resistance Rdson of the Low Side transistors. In that case, the signal corresponding to Rdson•I (where I is the phase current and Rdson a turn-on resistance of the Low Side transistor ML) is available only when the Low Side transistor ML is actually turned on by the controller. The reading circuit of the voltage Rdson•I must thus be activated only in this situation.

It is also known that an estimate of the phase current obtained by sampling the signal Rdson•I allows a controller to be implemented, which has excellent response features to the CPU load transients, and it also allows a signal to be obtained, which is useful for the so-called "current sharing" control and for protecting the controller from shortcircuits.

These controllers are thus equipped with a TRACK&HOLD device. In particular, during the sampling step the signal Rdson•I is detected (TRACK) and the reading circuit holds (HOLD) the last information being acquired.

In the case of a controller having at least three phases and drivers being integrated on the same substrate comprising the reading circuits, the reading of the signal Rdson•I is affected by the noise caused by the switching of the power transistors in the drivers which control the phases.

In that case, the track information is thus irreparably damaged by the noise produced by the switching of the external power transistors of the drivers integrated on the same silicon wherein the current reading circuits are also integrated (through the common substrate).

In order to solve the problem, insulation techniques of the drivers with respect to the analog section comprising the current-sense circuits are presently used, such as the die-to-die bonding, SOI substrates, etc. However these techniques are complex and expensive.

Therefore, a need has arisen for a method for generating a reading signal of a sense element in a phase of a multiphase controller having such structural and functional features as to allow the single step currents to be correctly read both on the low side transistors and on the inductors even with drivers being integrated on the same substrate as the current-sense circuits, and thus comprising power transistors. The noise produced by the switching of the power transistors would be eliminated through such a method, and many of the limits and/or drawbacks still affecting the controllers realized according to the prior art would be overcome.

SUMMARY

An embodiment of the present invention uses a convenient reading interval for low side transistors, so that the phase reading final instant of the low side transistors does not coincide with the rising or falling front of one of the turn-on controls related to the other phases.

Therefore, the reading interval selected for a phase sense element takes into account the turn-on and turn-off instants of the external power transistors in the driving circuits of the other controller phases not being read.

More specifically, this embodiment is a method for generating a reading signal of a sense element in at least a phase of a multiphase controller controlled by means of PWM control signals having a preset period and a duty cycle varying according to the load current and voltage of said controller, said reading signal being a digital signal having a first logic value during a reading period and a second logic value at the end of said reading period and showing a periodical trend which has a half cycle, wherein the value of said half cycle is set so that said reading period ends in a different instant from the switching instants of external power transistors in the driving circuits of said controller phases not being read.

BRIEF DESCRIPTION OF THE DRAWINGS

Features and advantages of the invention will be apparent from the following description of an embodiment thereof given by way of non limiting examples with reference to the attached drawings.

In the drawings:

FIGS. 6A to 6C show the trend versus time of signals within a multiphase controller obtained through a method according to an embodiment of the invention for different duty cycle values.

DETAILED DESCRIPTION

With reference to the drawings, a method for generating a reading signal of a sense element in a phase of a multiphase controller is now described according to an embodiment of the invention. In particular, a three-phase controller is analyzed by way of non limiting example.

As it will be clear in the following description, the proposed method calibrates the final reading instant (hereafter indicated as track) of the sense element belonging to a controller phase being read, so that it does not coincide with a rising or falling slope of the turn-on controls related to the other phases not being read. The last value being read in correspondence with this final instant is particularly the value then stored by a SAMPLE&HOLD mechanism equipping the controller.

Figure 1:
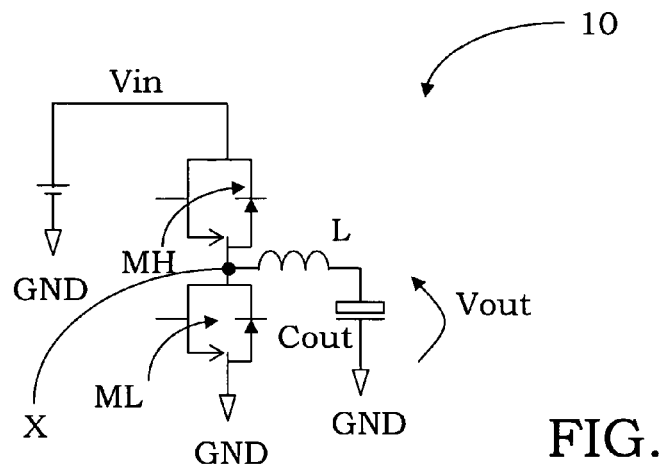
FIG. 1 shows a module or phase of a multiphase controller according to the prior art.
Figure 2A:
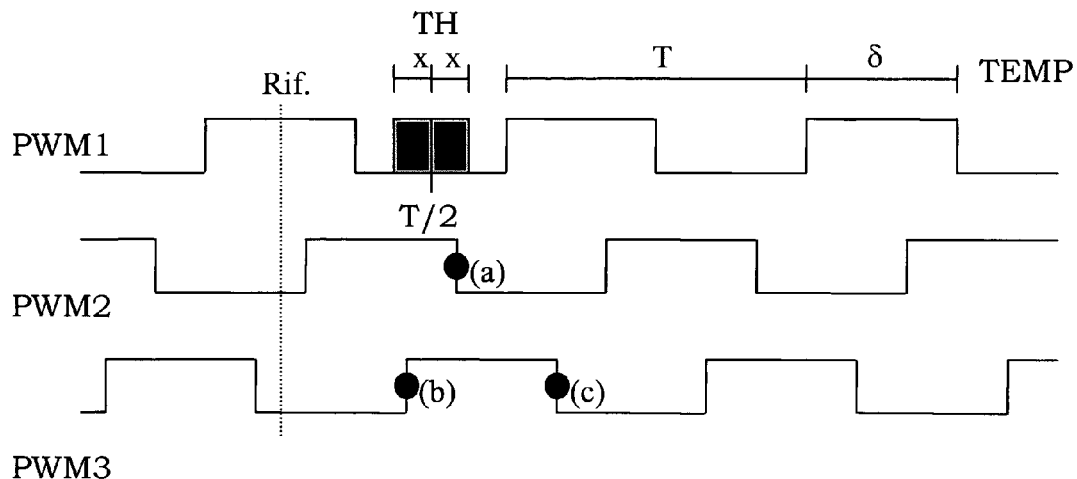
FIGS. 2A and 2B show the trend versus time of signals within a three-phase controller according to an embodiment of the invention.

Keeping by way of example the case of an interleaved three-phase controller, FIG. 2A shows the trend of three PWM control signals, indicated with PWM1, PWM2 and PWM3, being phase-shifted from each other by 120°. FIG. 2A also shows a reference signal TEMP for the time base.

The reading method uses a digital track signal TH having a logic value 1 during the reading period (TRACK) and a logic value 0 during the holding period of the last sampled information (HOLD). In particular, the digital track signal TH is centered at a distance corresponding to T/2 from a logic reference signal Rif as shown in FIG. 2A, T being the PWM signal period.

It is known to refer to a symmetrical track if the digital track signal TH is symmetrical with respect to the reference instant T/2. In the example shown in FIG. 2A, the track is symmetrical and it globally lasts 2x, x being the track half-life or half cycle.

In a dual manner, if the track starts at the instant T/2 after the reference signal Rif, it is then an asymmetrical track.

It should be observed that the symmetrical track makes the sampled signal more consistent with the phase current and it provides a better estimate, the ideal reading signal being provided by an infinitesimally lasting symmetrical track. Nevertheless, it limits the switching frequency, as explained hereafter.

Advantageously according to an embodiment of the invention, the reading method sets the instant wherein the track ends and the holding the acquired information (HOLD) starts so that it does not coincide with the turn-on and turn-off control instants of the external transistors not related to the phase being read. In particular, such switchings are controlled by the controller by means of the PWM signals having a duty cycle δ and interleaved phase shift corresponding to T/N (N being the number of active phases in the controller).

The method according to an embodiment of the invention thus provides for the checking of the "troubling" reading intervals, i.e., the values of the track half-life x coinciding with the conditions described by the following system, in the illustrative case of a three-phase controller.

$$\begin{cases} (a) \Rightarrow \dfrac{T}{3} + \delta\dfrac{T}{2} = \dfrac{T}{2} + x \\ (b) \Rightarrow \dfrac{2T}{3} - \delta\dfrac{T}{2} = \dfrac{T}{2} + x \\ (c) \Rightarrow \dfrac{2T}{3} + \delta\dfrac{T}{2} = \dfrac{T}{2} + x \end{cases} \quad (1)$$

being:
T the PWM control signal period;
δ the PWM control signal duty cycle; and
x the half-life of the track interval centered on a reference value corresponding to Rif+T/2.

Referring to FIG. 2A it is clear that the reading interval is so set as to end at an instant not coinciding in time with a turn-on or turn-off instant of the power transistors in the driving circuits of a phase preceding the being-read phase and not coinciding with a turn-off instant of the power transistors comprised in the driving circuits of a phase following the being-read phase.

In those instants, indicated with (a), (b) and (c) in FIG. 2A, the track operation would end just in correspondence with the PWM signal switchings and thus just in the instant wherein the power transistors in the driving circuits of the phases controlled by these PWM signals switch.

The solution of the condition system (1) is graphically shown in FIG. 2A and it comprises all the points of the lines S, i.e., pairs of values: duty cycle δ/track half-life x.

Figure 2B:
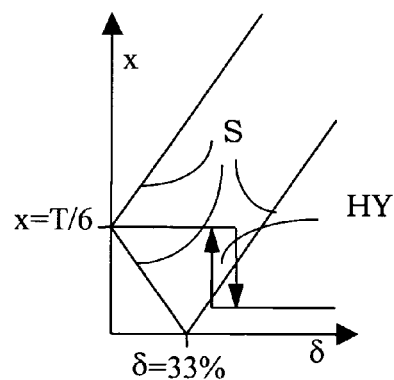

As it is evident in FIG. 2B, one cannot find a value x which is valid for each duty cycle δ. In particular, two different values x are set:

for low duty cycles δ, x is set equal to T/6, so that it is valid for δ→0;

for high duty cycles δ, x is decreased.

In other words, one selects a correct track half-life value x according to the current duty cycle, i.e., according to the PWM signal. Advantageously, the method according to an embodiment of the invention thus provides a track selection step (TRACK SELECT) in order to determine the half-life value x of a duty cycle δ.

In practice, a delay or time interval occurs between the PWM signal being processed in order to determine the track half-life and the real turn-on control provided by the drivers on the external power transistors of the phases not being read, which is estimated at about 125 ns, due to the drivers response time and to the waiting time required for the complete transistors turn-off in order to avoid cross-conduction phenomena.

This implies that for low duty cycles δ the univocal choice of a half-life x=T/6 is not correct.

Advantageously according to an embodiment of the invention, the delay is so exploited as to synchronize the portion following in time the reference value Rif+T/2 (hereafter indicated as right portion) of the track signal, whose end corresponds to the hold instant, with the 240° phase-shifted PWM signal, corresponding to the switching of the transistors of the relevant phase, the 240° phase-shifted phase. This situation would involve an error in an ideal situation, but just because of the delay in the control propagation, it is ensured that the final reading instant, i.e., the HOLD instant, precedes the turn-on of the high side transistor related to the phase being phase-shifted by 240° with respect to the one being read.

Figure 3B:
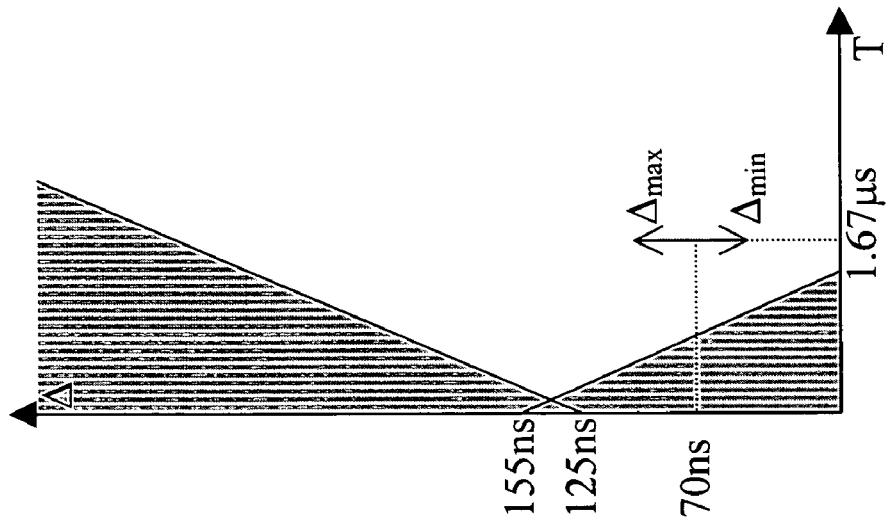
FIGS. 3A and 3B show the trend versus time of signals within a phase of a multiphase controller obtained through a method according to an embodiment of the invention.
Figure 3A:
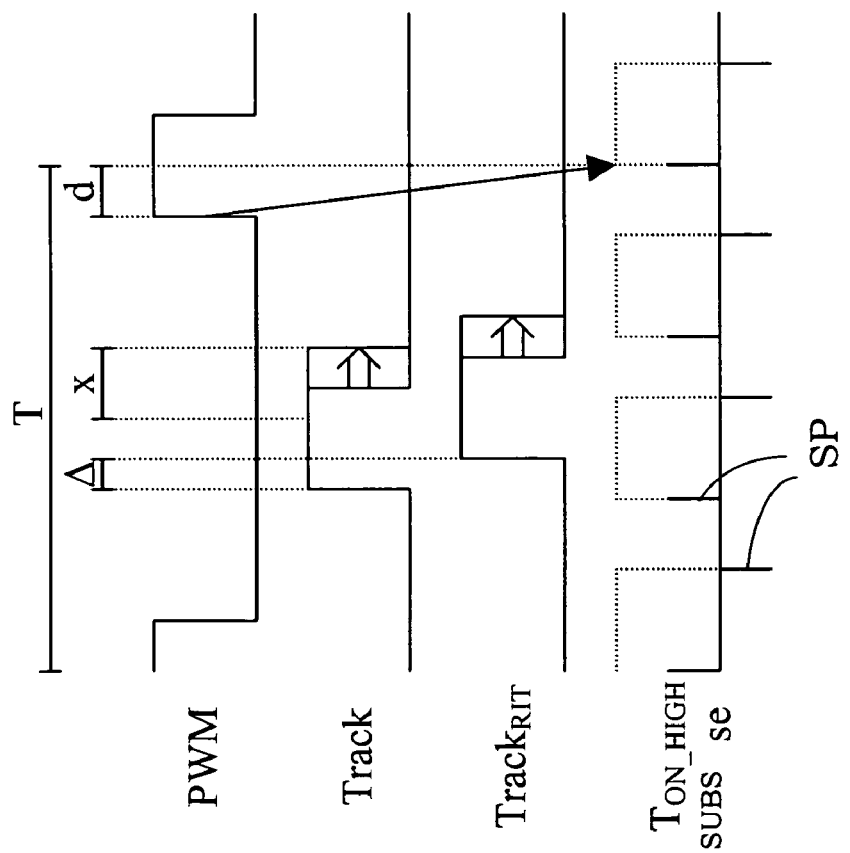

For a better understanding of the method for reading a sense element of a multiphase controller phase according to an embodiment of the invention, FIG. 3A shows the trends versus time (with reference to a single time base) of the Track and PWM signal of the phase, as well as the main noise to be avoided, i.e., the noise on the common substrate SUBS, the noise generated by turning-on and turning-off the high side transistors (TON_HIGH) of all the controller phases not being read.

It should be noted that noise spikes, indicated in FIG. 3A with SP, are delayed by a value d with respect to the corresponding PWM control signal.

In order to have a symmetrical track, some value of increasing and decreasing duty cycles is taken into account. Advantageously according to an embodiment of the invention a hysteresis interval (indicated with HY in FIG. 2B) is provided, having a triggering threshold between a sampling time and the other corresponding to Sth1 for increasing duty cycles δ and Sth2 for decreasing duty cycles δ.

A delay δ is also added to the track signal to be sure that all spikes on the substrate SUB are avoided. It should be noted that this delay δ is added by the method according to an embodiment of the invention, the other delays or time intervals being taken into account indicating conditions to be satisfied due to the external circuitry. The delayed track signal $Track_{RIT}$ shown in FIG. 3A is thus obtained.

Finally, a second time interval Tscs is defined in order to take into account the time required by the noise caused by a spike during the turn-on time of a SAMPLE&HOLD device comprised in each phase to extinguish.

The condition system to be solved by the reading method according to an embodiment of the invention is thus the following:

$$\begin{cases} \frac{T}{2} + \frac{T}{6} + \Delta > \frac{2T}{2} + d + T_{scs} \\ \frac{T}{2} + \frac{T}{6} + \Delta < \frac{2T}{2} + d \end{cases} \quad (2)$$

The solution is graphically shown by the not-shaded area of the diagram of FIG. 3B for Tscs corresponding to 30 ns.

In a practical example, by using a threshold corresponding to 66%, in order to have a symmetrical track, a hysteresis interval (indicated with HY) is provided, having a triggering threshold between a sampling time and the other corresponding to 56.7% (for increasing duty cycles δ) and to 50% (for decreasing duty cycles δ): in this case, by solving the equation system (1), a track time having a half-life x equal to 0.025T is obtained.

Figure 4B:
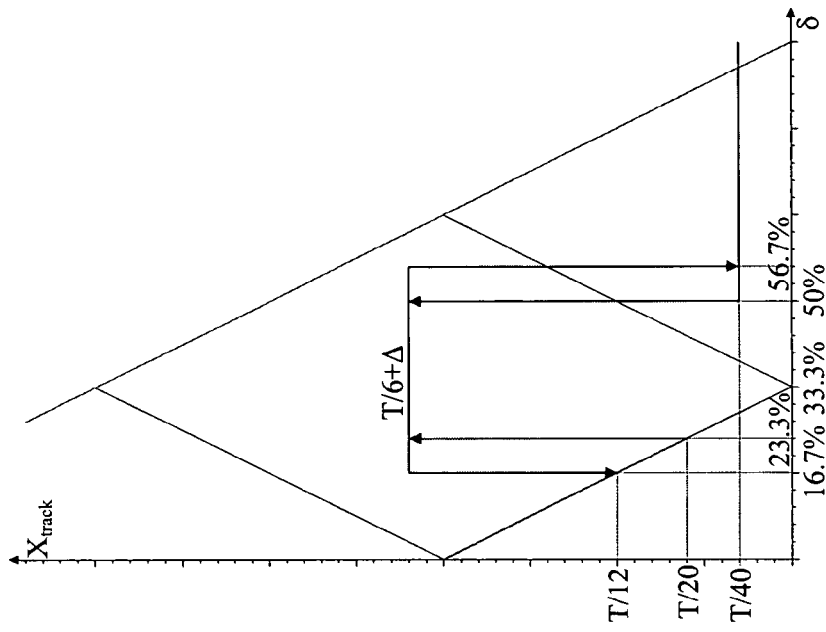
FIGS. 4A and 4B show the trend versus time of a track signal obtained through a method according to an embodiment of the invention.
Figure 4A:
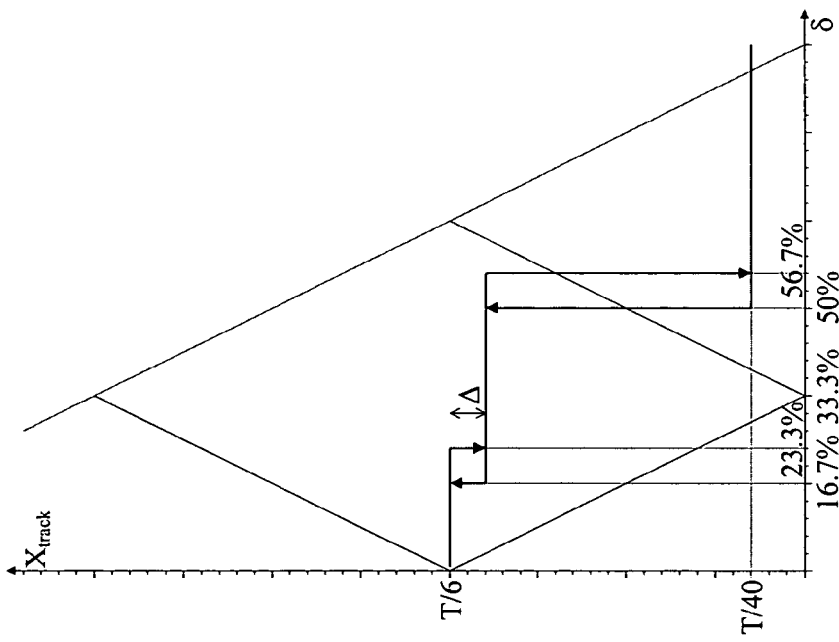

Moreover, for increasing duty cycles δ a further threshold Sth3 corresponding to 23.3% is selected to turn back to the original selection of a minimum track half-life value equal to x=T/6, as shown in FIGS. 4A and 4B illustrating the trend of the track signal of the portion preceding in time (left portion) and of the portion following in time the reference value Rif+T/2 (right portion) of the track signal.

In particular, it can be verified that a critical situation is the one related to the Track signal triggering for δ=23.3%, forcing the delay δ to be inserted.

Assuming now that the highest operating frequency is equal to 600 KHz, the delay δ being inserted is equal to 70 ns. Actually, the value of this delay Δ, due to process spreads, is not reliable at all, but it varies even by 40% between a minimum value Δmin=42 ns and a maximum value Δmax=98 ns. Advantageously according to an embodiment of the invention, the value intervals which the second delay δ can take remain in the allowed area shown in FIG. 3B.

The selection of the track signal half-life x, for the right and left portions shown in FIGS. 4A and 4B, however involves the following frequency limitations:

1) for high duty cycle values δ (δmax=80%), taking into account that the settling time for a current reading circuit is equal to 150 ns, the maximum operating frequency fmax is obtained by applying the formula:

$$\frac{(1-\delta_{max})T}{2} = x + 150 \text{ ns} \quad (3)$$

i.e., for $T = 2\mu s$, $f\max 1 = 500$ KHz.

2) for δ=56.7%, just before the sampling time variation (for x=0.167T), it results that:

$$\frac{(1-0.567)T}{2} = x - \Delta_{min} + 150 \text{ ns} \quad (4)$$

i.e., a highest operating frequency corresponding to $f\text{max}2 = 462$ KHz.

3) finally, considering that a sampling time corresponding to 70 ns:

$$2x > 70 \text{ ns} \Rightarrow T > 1.4 \, \mu s \quad (5)$$

obtains a maximum operating frequency corresponding to fmax3=714 KHz.

It can be immediately verified that the most stringent limitation for the maximum operating frequency derives from the condition 2), involving a noise at the beginning of the reading phase for frequency exceeding fmax2, but not an error in the value being hold at the track end.

Advantageously, it is possible to solve this limitation by using an asymmetrical track, that is starting from a value T being far from the reference Rif and with amplitude x. In that case, the limitations for the maximum operating frequency become, for the same values x:

$$\frac{(1-\delta_{max})T}{2} = \max(x, 150 \text{ ns}) \Rightarrow \quad (6)$$
$$T = 1.5 \, \mu s \Rightarrow f_{max\,1}$$
$$= 667 \text{ KHz}$$

$$\frac{(1-0.567)T}{2} = \max(x, 150 \text{ ns}) \Rightarrow \quad (7)$$
$$T = 0.75 \, \mu s \Rightarrow f_{max\,2}$$
$$= 1.44 \text{ MHz}$$

$$x > 70 \text{ ns} \Rightarrow T > 2.8 \, \mu s \Rightarrow f_{max\,3} = 357 \text{ KHz} \quad (8)$$

In this case the last limitation (8) can be adjusted by simply increasing the value x, without affecting the two others (6) and (7), which depend on the settling time, being the condition satisfied on the maximum frequency value.

In particular, by selecting a track half-life value x=0.05T, being twice the previous one, the limitations become fmax1=667 KHz, fmax2=1.44 MHz and fmax3=714 KHz.

Figure 5:
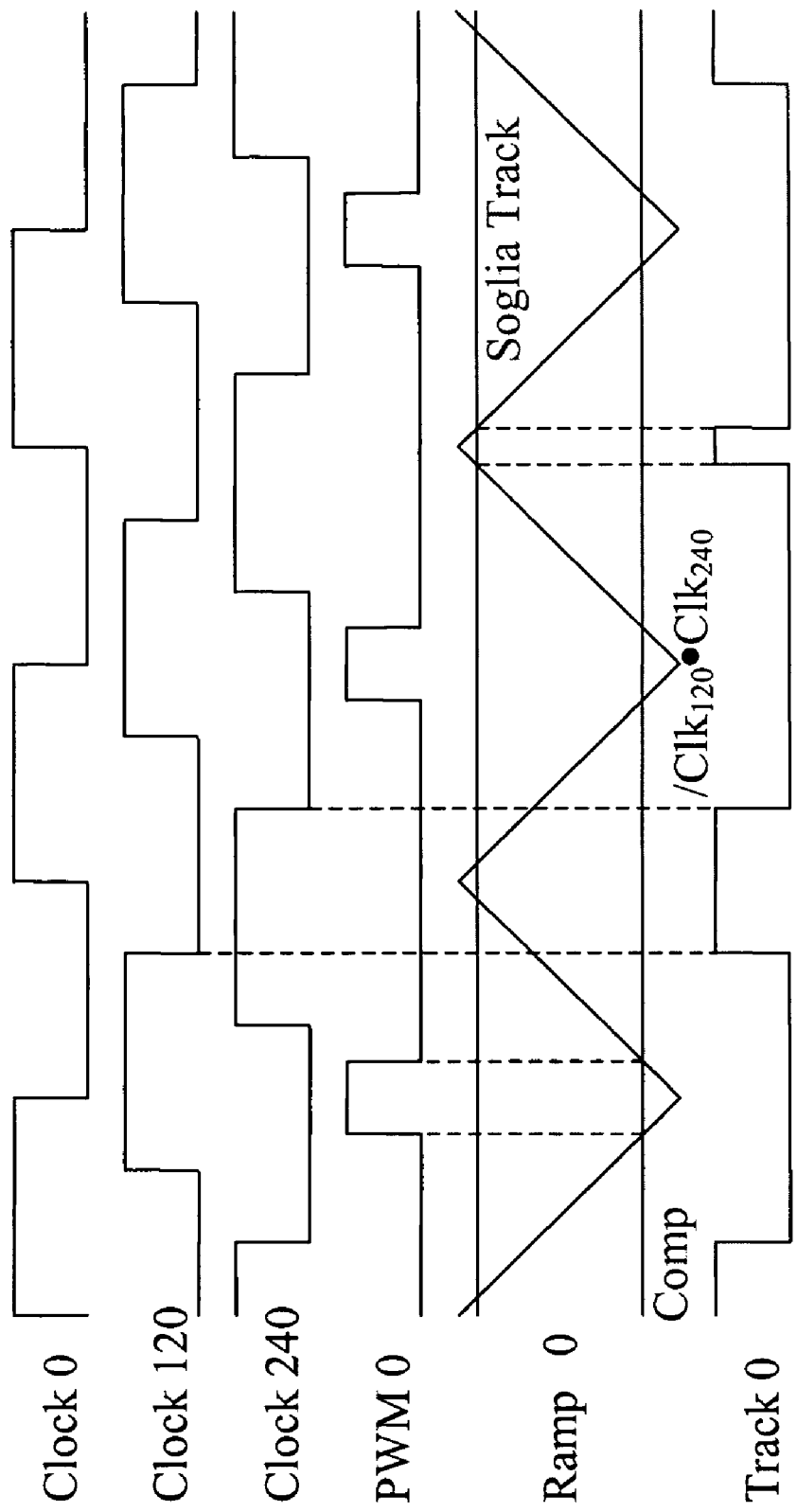
FIG. 5 shows the trend versus time of signals within a three-phase controller obtained through a method according to an embodiment of the invention for different duty cycle values.

The track signal generation of the method according to an embodiment of the invention, schematically shown in FIG. 5, will now be seen in greater detail.

The generation of the track signal related to the phase 1 of a three-phase system will be considered by way of example, the other phases being thus phase-shifted by T/3 and 2T/3, i.e., by 120 and 240 degrees.

As it is known, an analog signal COMP generates the PWM control signal with a ramp signal.

Advantageously according to an embodiment of the invention, two different methods are provided for generating the track signals related to high and low duty cycles. In particular, for high duty cycles (δ>56.7%), by means of a fast symmetrical-response comparator, the slope (comprised between 1V and 4V) related to the phase in test is compared with a threshold corresponding to Vsogliatrack=3.85V, thus generating a symmetrical track signal corresponding to 0.05T (x=0.025T, track=2x).

for low duty cycles (δ<56.7%), the desired track signal, with duration T/3, is generated in a combinatorial way by the two phases not being read, observing that it can be obtained (for the first phase) by the formula:

$$\overline{\text{Clock}_{120}} \cdot \text{Clock}_{240} \quad (9)$$

Two signals related to the phases not being read are thus obtained. In order to decide which of the two signals is to be used, the signal COMP related to the phase is compared with two thresholds corresponding to δ=56.7% (2.7V) for increasing duty cycles, and δ=50% (2.5V) for decreasing duty cycles, by means of an hysteresis comparator which, according to the presently selected signal (comparator output), distinguishes between the two situations.

It should be noted that, during the time period wherein a certain value is assigned to the track signal, this hysteresis comparator should not be able to change its selection, in order to avoid glitches. To this purpose, the hysteresis comparator output is masked by means of a latch controlled by the PWM phased signal.

The track signal thus undergoes the following operations:

1) a first logic AND operation with the negative value of the internal turn-on control signal (before the driver) on the low side transistor of the phase being read coming from the reading logic of this transistor when it is actually on. It should be noted that the control signal on the external transistors will be the opposite of the internal control signal. In particular, this control signal, by using the driver delay, avoids the reading of the current when it passes through the transistor body diode during the turn-off thereof.

2) a second logic AND operation with the clock signal of the phase being read if it is decided to use an asymmetrical track signal. It should be noted that, in this case, a change of the threshold value could be necessary for the track generation: x=0.05T requires Vsogliatrack=3.7V.

One further conditions the symmetrical track signal distinguishing between very low duty cycle values δ<23% and medium low 23.3%<δ<56.7%, correspondingly to what has been described with reference to FIGS. 4A and 4B:

if the duty cycle δ is very low (δ<23.3%), the track signal is AND-operated with the opposite of the internal control signal of the low side transistor related to the previous phase (in the case being shown, the one being phase-shifted by 240°). This situation is identified at the output of a comparator having a threshold δ=23.3% (1.7V) for increasing duty cycles, and δ=16.7% (1.5V) for decreasing duty cycles, consistently with what has been shown in FIGS. 4A and 4B.

if the duty cycle δ is medium low (23.3%<δ<56.7%), the delay δ is inserted, as previously indicated.

Figure 6C:
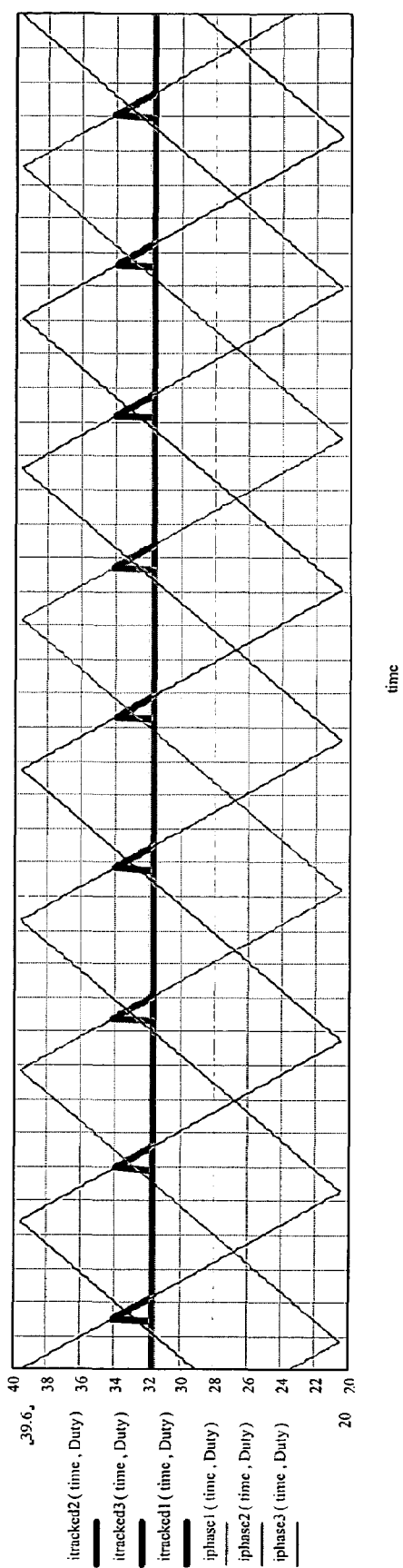

FIGS. 6A to 6C show the trends versus time of the currents of the phases (with thin strokes) and of the relevant sampled signals (with thick strokes) in the case of very low (δ<23.3%), medium low (23.3%<δ<56.7%) and high (δ>56.7%) duty cycles δ respectively.

In particular, it should be noted in FIG. 6A that the track time for each phase (wherein the sample signal follows the phase current signal) ends before the low side transistor turn-off (falling phase of the inductance current S1) of the previous phase. This time difference is intrinsic of the controller and it is linked to the delay of the drivers being integrated in the controller, indicated with B in FIG. 6A. Moreover, the track signal generation, starting from the fixed-cycle T/3 signal by means of an AND operation with the opposite value of the internal turn-on control signal of the low side transistor of the previous phase, is indicated with A.

In FIG. 6B it should be instead noted that the track signal is reset as equal to T/3 and symmetrical (equal to T/6 on the right and to T/6 on the left with respect to the instant T/2 of the reference signal, as indicated with C). A delay equal to A is added to the track time as a time edge to the noise generated by the low side transistor turn-off and by the high side transistor turn-on of the previous phase (as indicated with D).

Finally, in FIG. 6C, it should be noted that the track signal is drastically reduced consistently with what has been shown in FIGS. 4A and 4B.

In conclusion, a method for generating a track signal for reading a sense element in a phase of a multiphase controller prevents the track ends from corresponding with the switchings of power transistors in the driving circuits of controller phases not being read, taking into account the propagation delays of the control signals and the extinguishing thereof.

These techniques described in conjunction with FIGS. 2-6C can be implemented in a power-supply controller, which can be incorporated into an electronic system such as a computer system according to an embodiment of the invention.

From the foregoing it will be appreciated that, although specific embodiments of the invention have been described herein for purposes of illustration, various modifications may be made without deviating from the spirit and scope of the invention.

What is claimed is:

1. A method for generating a reading signal of a sense element in at least a phase of a multiphase controller controlled by means of PWM control signals having a preset period and a duty cycle varying according to the load current and voltage of said controller, said reading signal being a digital signal having a first logic value during a reading period and a second logic value at the end of said reading period and showing a periodical trend which has a half cycle, wherein the value of said half cycle is set so that said reading period ends in a different instant from the switching instants of external power transistors comprised in the driving circuits of said controller phases not being read.

2. A method according to claim 1, wherein the value of said half cycle is set so that said reading interval ends in an instant not coinciding in time with a turn-on or turn-off instant of power transistors in driving circuits of a phase preceding said phase being read and not coinciding with a turn-off instant of power transistors in driving circuits of a phase following said phase being read.

3. A method according to claim 1, wherein the method provides different values of said half cycle if said duty cycle of said PWM control signals belongs to a first, a second and a third value interval.

4. A method according to claim 1, wherein said reading signal satisfies the conditions due to a first time interval corresponding to an interval elapsing between the switching instant of a PWM control signal and the turn-on instant of said power transistors of said phases not being concerned by the reading.

5. A method according to claim 4, wherein said first time interval is correlated to a response time of control circuits of said power transistors and to a waiting time being required for the complete transistor turn-off of said transistors in order to avoid cross-conduction phenomena.

6. A method according to claim 1, wherein the method provides an hysteresis interval with a first and a second triggering threshold for increasing duty cycles and decreasing duty cycles respectively.

7. A method according to claim 1, wherein said reading signal has a fixed delay according to an instantaneous value of said duty cycle.

8. A method according to claim 1, wherein said reading signal satisfies the conditions due to a second time interval corresponding to an extinction time of a noise signal caused by a turn on during a turn-on period of a SAMPLE&HOLD device comprised in each phase.

9. A method according to claim 1 for generating a reading signal of a sense element comprised in a phase of a three-phase controller controlled by means of PWM control signals having a period and a duty cycle being preset and phase-shifted from each other by 120°, wherein the method provides a checking step of the following conditions:

$$\begin{cases} (a) \Rightarrow \dfrac{T}{3} + \delta\dfrac{T}{2} = \dfrac{T}{2} + x \\ (b) \Rightarrow \dfrac{2T}{3} - \delta\dfrac{T}{2} = \dfrac{T}{2} + x \\ (c) \Rightarrow \dfrac{2T}{3} + \delta\dfrac{T}{2} = \dfrac{T}{2} + x \end{cases}$$

the conditions (a), (b) and (c) corresponding to the switching instants of said PWM signals.

10. A method according to claim 9, wherein said half cycle is preferably equal to one sixth of the period of said PWM control signals for duty cycle values approaching to zero.

11. A method according to claim 9, further comprising a checking step of the following conditions:

$$\begin{cases} \dfrac{T}{2} + \dfrac{T}{6} + \Delta > \dfrac{2T}{3} - \dfrac{\delta T}{2} + d + T_{scs} \\ \dfrac{T}{2} + \dfrac{T}{6} + \Delta < \dfrac{2T}{3} + \dfrac{\delta T}{2} + d \end{cases}.$$

12. A method according to claim 2, of the type comprising a generation step of said PWM control signals by means of an analogue signal starting from an analogue-slope signal, wherein the method comprises the steps of:

for duty cycle values in said third interval, comparing said slope with a first threshold value in order to generate a symmetrical reading signal; and for duty cycle values in said first interval, combining the signals obtained from the phases not being concerned by the reading by means of the formula:

$$\overline{\text{Clock}_{120}} \cdot \text{Clock}_{240} \qquad (9)$$

and comparing said signals with said analogue signal by using two different threshold values for increasing duty cycles and decreasing duty cycles.

13. A method according to claim 12, wherein said reading signal undergoes the following processing:

a first logic operation with a negative value of an internal turn-on control signal on a transistor of said phase being read; and a second logic operation with a clock signal of said phase being read by using a second threshold value.

14. A method according to claim 12, wherein the method provides:

for duty cycle values comprised in said first interval, a first logic operation of said reading signal with a negative value of a control signal of a transistor related to the previous phase; and for duty cycle values comprised in said second interval, said one delay is inserted.

15. A power-supply controller, comprising:
phase-control circuits each operable to control a respective drive circuit that provides a respective current to a load; and
a current-sense circuit operable to sample the current provided to the load by one of the drive circuits only while the other drive circuits are in non-switching states.

16. The power-supply controller of claim 15 wherein:
the phase-control circuits operate the respective drive circuits with a common duty cycle; and
the current-sense circuit is operable to sample the current at a time that is related to the common duty cycle.

17. The power-supply controller of claim 15, further comprising:
a phase-clock generator operable to generate a respective phase clock for each of the phase-control circuits, the phase clocks shifted from one another by equal phase shifts that sum to 360 degrees;
wherein in response to the phase clocks, the phase-control circuits operate the respective drive circuits with a common duty cycle;
wherein the current-sense circuit is operable to sample the current at a first time when the common duty cycle is within a first range and at a second time when the common duty cycle is within a second range.

18. A power-supply controller, comprising:
phase-control circuits each operable to control a respective drive circuit that provides a respective current to a load;
a current-sense circuit operable to sample the current provided to the load by one of the drive circuits only while the other drive circuits are in non-switching states; and
a phase-clock generator operable to generate a respective phase clock for each of the phase-control circuits, the phase clocks shifted from one and other by equal phase shifts that sum to 360 degrees;
wherein
in response to the phase clocks, the phase-control circuits operate the respective drive circuits with a common duty cycle;
the current-sense circuit is operable to sample the current at a first time when the common duty cycle is within a first range and at a second time when the common duty cycle is within a second range;
the first range of the common duty cycle comprises 0 to approximately 16.7 degrees and greater than approximately 50 degrees;
the second range comprises approximately 33 degrees;
the first time corresponds approximately to one half of the period of the phase clock for the phase-control circuit operable to drive the one of the drive circuits; and
the second time corresponds to approximately two thirds of the period.

19. A power-supply controller, comprising:
phase-control circuits each operable to control a respective drive circuit that provides a respective current to a load;
a current-sense circuit operable to sample the current provided to the load by one of the drive circuits only while the other drive circuits are in non-switching states; and
a phase-clock generator operable to generate a respective phase clock for each of the phase-control circuits, the phase clocks shifted from one and other by equal phase shifts that sum to 360 degrees;
wherein
in response to the phase clocks, the phase-control circuits operate the respective drive circuits with a common duty cycle;
the current-sense circuit is operable to sample the current at a first time when the common duty cycle is within a first range and at a second time when the common duty cycle is within a second range;
the first range of the common duty cycle comprises 0 to approximately 16.7 degrees and greater than approximately 50 degrees;
the second range comprises approximately 33 degrees;
the first time corresponds approximately to five sixths of the period of the phase clock for the phase-control circuit operable to drive the one of the drive circuits; and
the second time corresponds to approximately two thirds of the period.

20. A power-supply controller, comprising:
phase-control circuits each operable to control a respective drive circuit that provides a respective current to a load;
a current-sense circuit operable to sample the current provided to the load by one of the drive circuits only while the other drive circuits are in non-switching states; and
a phase-clock generator operable to generate a respective phase clock for each of the phase-control circuits, the phase clocks shifted from one and other by equal phase shifts that sum to 360 degrees;
wherein
in response to the phase clocks, the phase-control circuits operate the respective drive circuits with a common duty cycle;
the current-sense circuit is operable to sample the current at a first time when the common duty cycle is within a first range and at a second time when the common duty cycle is within a second range;
the first range of the common duty cycle comprises 0 to approximately 16.7 degrees and greater than approximately 50 degrees;
the second range comprises approximately 33 degrees;
the first time corresponds approximately to a sum of one half of the period of the phase clock for the phase-control circuit operable to drive the one of the drive circuits and a predetermined delay; and
the second time corresponds approximately to a sum of two thirds of the period and the predetermined delay.

21. A power-supply controller, comprising:
phase-control circuits each operable to control a respective drive circuit that provides a respective current to a load;
a current-sense circuit operable to sample the current provided to the load by one of the drive circuits only while the other drive circuits are in non-switching states; and
a phase-clock generator operable to generate a respective phase clock for each of the phase-control circuits, the phase clocks shifted from one and other by equal phase shifts that sum to 360 degrees;
wherein
in response to the phase clocks, the phase-control circuits operate the respective drive circuits with a common duty cycle;
the current-sense circuit is operable to sample the current at a first time when the common duty cycle is within a first range and at a second time when the common duty cycle is within a second range;
the first range of the common duty cycle comprises 0 to approximately 16.7 degrees and greater than approximately 50 degrees;
the second range comprises approximately 33 degrees;
the first time corresponds approximately to a sum of five sixths of the period of the phase clock for the phase-control circuit operable to drive the one of the drive circuits and a predetermined delay; and the second time corresponds to approximately a sum of two thirds of the period and the predetermined delay.

22. A power-supply controller, comprising:

phase-control circuits each operable to control a respective drive circuit that provides a respective current to a load;

a current-sense circuit operable to sample the current provided to the load by one of the drive circuits only while the other drive circuits are in non-switching states; and a phase-clock generator operable to generate a respective phase clock for each of the phase-control circuits, the phase clocks shifted from one and other by equal phase shifts that sum to 360 degrees;

wherein in response to the phase clocks, the phase-control circuits operate the respective drive circuits with a common duty cycle;

the current-sense circuit is operable to sample the current at a first time when the common duty cycle is within a first range and at a second time when the common duty cycle is within a second range;

the first range comprises a first subrange in response to the common duty cycle decreasing and a second subrange in response to the common duty cycle increasing, the first and second subranges offset by a hysteresis value; and the second range comprises a third subrange in response to the common duty cycle decreasing and a fourth subrange in response to the common duty cycle increasing, the third and fourth subranges offset by the hysteresis value.

23. A power-supply controller, comprising:

drive circuits each operable to provide a respective current to a load;

phase-control circuits each operable to control a respective one of the drive circuits; and a current-sense circuit operable to sample the current provided to the load by one of the drive circuits only while the other drive circuits are in non-switching states.

24. A power supply, comprising:

drive circuits each operable to provide a respective current to a load;

filter circuits each operable to be coupled between a respective one of the drive circuits and the load;

phase-control circuits each operable to control a respective one of the drive circuits; and a current-sense circuit operable to sample the current provided to the load by one of the drive circuits only while the other drive circuits are in non-switching states.

25. A method, comprising:

switching drive circuits to provide respective portions of a current to a load; and sampling a portion of the current from one of the drive circuits only while the other drive circuits are not being switched.

26. The method of claim 25 wherein switching the drive circuits comprises switching each of the drive circuits in a predetermined phase relationship relative to the other drive circuits.

27. The power-supply controller of claim 15 wherein the current-sense circuit is further operable to sample the current provided to the load by one of the drive circuits only while said drive circuit is in a non-switching state.

28. The method of claim 25 further comprising sampling a portion of the current from one of the drive circuits only while said drive circuit is not being switched.

29. The method of claim 25 wherein sampling a portion of the current from one of the drive circuits comprises measuring the voltage across a transistor of the drive circuit providing the current to the load.

30. A power-supply controller, comprising:

phase-control circuits each operable to control a respective drive circuit that provides a respective current to a load; and a current-sense circuit operable to sample the current provided to the load by one of the drive circuits only while said drive circuit is in a non-switching state.

31. A method, comprising:

switching drive circuits to provide respective portions of a current to a load; and sampling a portion of the current from one of the drive circuits only while said drive circuit is not being switched.

32. The power-supply controller of claim 23 wherein one of the drive circuits includes a transistor operable to provide the current to the load, and wherein the current-sense circuit is operable to sample the current provided to the load by measuring the voltage across the transistor.

\* \* \* \* \*